United States Patent [19]

Bliven

[11] 4,010,585
[45] Mar. 8, 1977

[54] STRUCTURAL FRAME - WINDOW PANE ASSEMBLY

[76] Inventor: Thomas G. Bliven, 1834 N. 87th St., Scottsdale, Ariz. 85257

[22] Filed: Nov. 5, 1973

[21] Appl. No.: 412,739

[52] U.S. Cl. .................................. 52/308; 52/456; 52/476
[51] Int. Cl.² ...................... E06B 3/62; F06B 3/22; E04F 19/06
[58] Field of Search ............ 52/308, 476, 456, 208, 52/213, 214; 40/152, 154; 49/DIG. 2, 463

[56] References Cited

UNITED STATES PATENTS

| 651,994 | 6/1900 | Holland | 52/476 X |
|---|---|---|---|
| 741,197 | 10/1903 | Wadey | 52/476 X |
| 2,153,149 | 4/1939 | MacHang | 40/154 |
| 3,455,080 | 7/1969 | Meadows | 52/476 |

FOREIGN PATENTS OR APPLICATIONS 1,311,727  10/1962  France .................................. 40/152

Primary Examiner—J. Karl Bell
Attorney, Agent, or Firm—Drummond, Nelson & Ptak

[57] ABSTRACT

A structural frame - window pane assembly includes a single-piece frame member shaped and dimensioned to receive and enclose the periphery of the window pane, and a window pane retained within the frame by a pair of spaced inwardly projecting resiliently deformable flanges formed integrally on the inner periphery of the frame member to receive and sealingly engage the edges of the pane. An elongate slot is provided in the frame through which the pane is inserted.

1 Claim, 5 Drawing Figures

STRUCTURAL FRAME - WINDOW PANE ASSEMBLY

This invention relates to a structural frame-window pane assembly.

More particularly, the invention concerns an improved frame - pane assembly specially formed and assembled to provide a unitary assembly of reduced cost.

In an even further and more specific respect, the invention relates to a specially formed single-piece frame member into which the window pane can be inserted without use of special equipment or the employment of highly skilled glazing labor.

In accordance with most prior art techniques, the assembly of window frames and panes requires highly skilled labor and is a time-consuming and expensive operation. In addition, in many prior art window frame - pane constructions, the assemblies are subject to deterioration over a period of time, especially at the points at which edges of the pane are sealed by putty, etc., to the frame to prevent leakage of air, moisture and dust. Also, many prior art window frame - pane assemblies are subject to mechanical failure due to corrosion of the frame structure and sealing gaskets because of weathering and atmospheric pollution.

Accordingly, it would be highly desirable to provide a window frame - pane construction which is more economical to produce and which requires less highly skilled labor and time to assemble. It would also be highly desirable to provide a combination structural window frame - pane assembly having means for sealing the pane in the frame which has improved resistance to deterioration and in which the frame is more resistant to failure from atmospheric corrosion.

Accordingly, it is a principal object of the present invention to provide an improved structural window frame - pane assembly.

Another object of the invention is to provide a frame - window pane assembly which is simplified and more economical to construct.

Still another object of the invention is to provide a window frame - pane assembly which requires less highly skilled labor and a shorter time to assemble.

Yet another and further object of the invention is to provide an assembly of the type described in which the window pane is sealingly engaged with the frame in an improved manner and in which the sealing means are more resistant to failure from corrosion or deterioration from weathering.

These and other, further and more specific objects and advantages of the invention will be apparent to those skilled in the art from the following detailed description thereof taken in conjunction with the drawings, in which.

Briefly, in accordance with the invention, I provide a structural frame - window pane assembly comprising, in combination, a single-piece frame member formed of moldable plastic, shaped and dimensioned to receive and enclose the periphery of the window pane, including a pair of spaced, inwardly projecting, resiliently deformable flanges formed integrally on the inner preiphery of the frame member to receive and sealingly engage the edges of the pane therebetween. Means are provided which define an elongate slot formed in the frame member, the slot being shaped and dimensioned to slidably receive the pane therethrough for seating the edges thereof between the inwardly projecting flanges of the frame member. A window pane, shaped and dimensioned to be inserted through the slot, is retained within the frame by sealing engagement of the edges thereof between the inwardly projecting flanges.

In a presently preferred embodiment of the invention, the inner walls of the slot diverge at the periphery of the pane member to facilitate locating the leading edge of the window pane when inserted therethrough. The inner walls of the slot are continuous with the inner walls of the spaced inwardly projecting flanges which are formed integrally therewith.

In a further preferred embodiment of the invention, the edges of the inner walls of the spaced flanges diverge to facilitate locating the edges of the window pane to be received and sealingly engaged therebetween when inserted through the slot.

In still another perferred embodiment of the invention, specially adapted for use in automobiles and other vehicles, the pane is slidably retained within the frame to provide for opening the window when desired.

Finally, in still another preferred embodiment of the invention, the inner walls of the spaced flanges are normally spaced a distance smaller than the thickness of the edge of the window pane. The flanges are shaped and dimensioned to be resiliently deformable outwardly by the edges of the pane received therebetween, thus providing "line" sealing engagement between the edges of the pane and the inner walls of the flange members.

Figure 1:
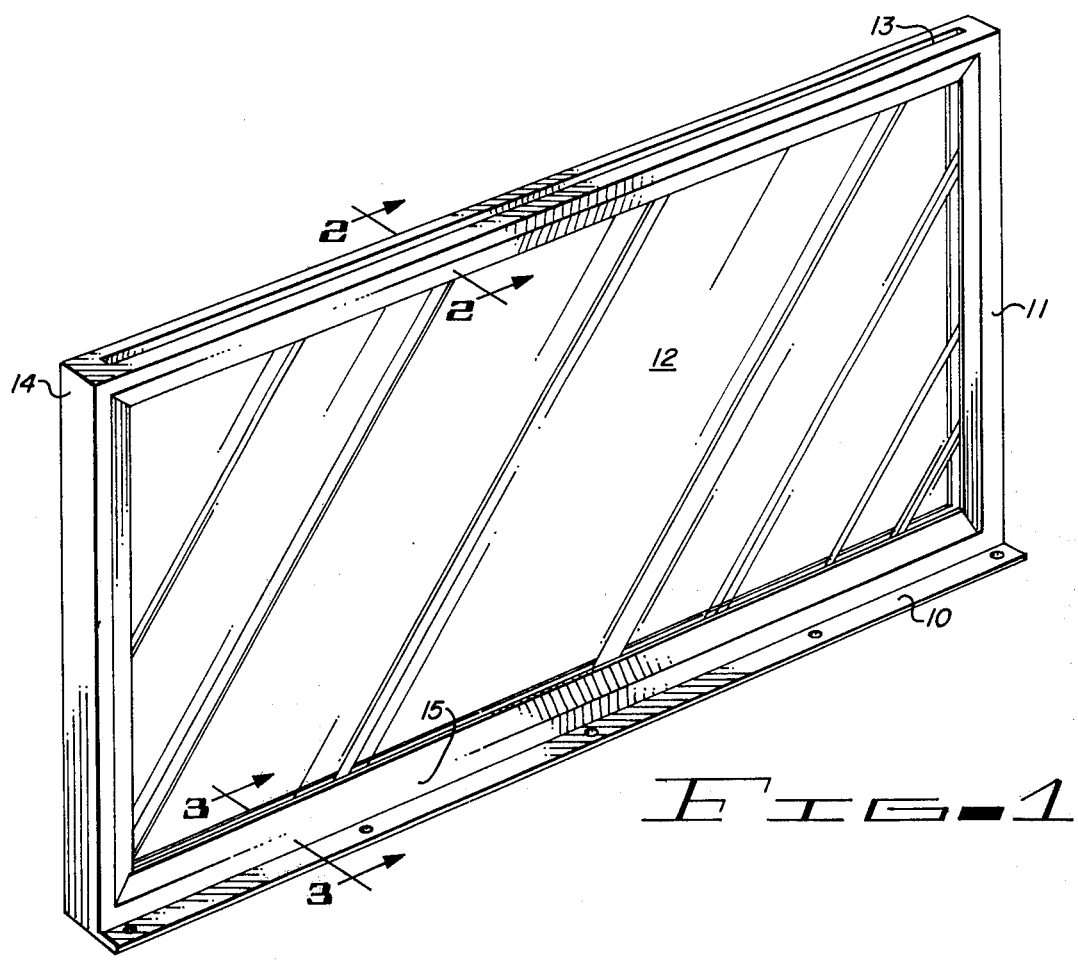
FIG. 1 is a perspective view of a typical rectangularly shaped window frame - pane assembly embodying the present invention.

Turning now to the drawings, in which the various preferred embodiments of the invention are depicted for purposes of illustration, FIG. 1 illustrates a conventional rectangularly shaped assembly consisting of a single-piece frame member 11 which is formed by injection molding or any other suitable technique from moldable plastic material. For example, in accordance with the presently preferred embodiment of the invention, the frame member is formed of injection-moldable mylon "filled" with glass fiber. It will be understood, however, that the specific plastic material of which the frame 11 is to be constructed will be chosen according to its art-recognized chemical and physical properties to suit the requirements of the particular application, a principal factor to be considered being the requirement that the flanges 17 be resiliently deformable to deflect outwardly to accommodate the pane 12 therebetween and to provide proper line sealing contact with the edges of the pane 12. Other considerations, such as creep properties, suitability for injection molding or other forming technique, cost and mechanical strength will, of course, be taken into account but the selection of the particular material will be well within the capability of persons skilled in the plastics arts having regard for the disclosure hereof.

The frame member is shaped and dimensioned to receive and enclose the peripheral edges of a window pane 12 which is inserted into the frame 11 through the slot 13. As will be apparent, the slot could be formed on the top of the assembly as shown in FIG. 1 or, depending on the final use of the window, the slot 13 could be located in either of the edges 14 of the frame or the bottom 15 thereof.

The window assembly can be fixed to a supporting structure such as a sill by means of a flange 10 formed integrally with the frame 14. The flange 10 can extend around all sides of the frame, if required, but for clarity, only the flange along the bottom edge of the frame 14 is shown.

Figure 2:
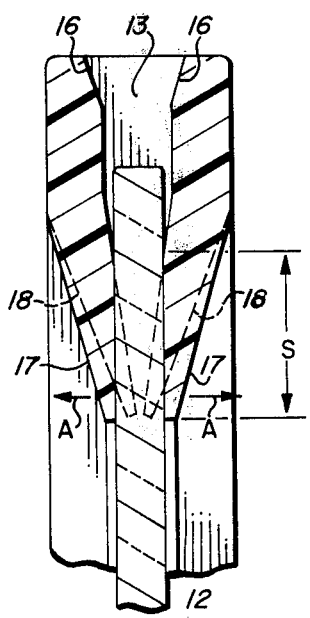
FIG. 2 is a sectional view of the frame - pane assembly of FIG. 1 taken along section line 2—2 thereof.

Referring to FIG. 2, the slot 13 is preferably shaped such that the upper edges 16 of the slot 13 diverge outwardly to facilitate locating the pane 12 for insertion therethrough. The initial position of the inwardly projecting flange members 17 is shown by the dashed lines 18. As the pane 12 is inserted therebetween, the flanges 17 are deformed outwardly in the direction of the arrows A to the position indicated by the solid lines, thus providing sealing engagement between the pane 12 and the flanges 17 along a substantial line S, rather than merely providing a so-called "point contact". The length of the line seal S, according to the preferred embodiment of the invention, is at least equal to the thickness of the window pane 12 and preferably substantially in excess thereof, say, for example, at least twice the thickness of the pane 12.

Figure 3:
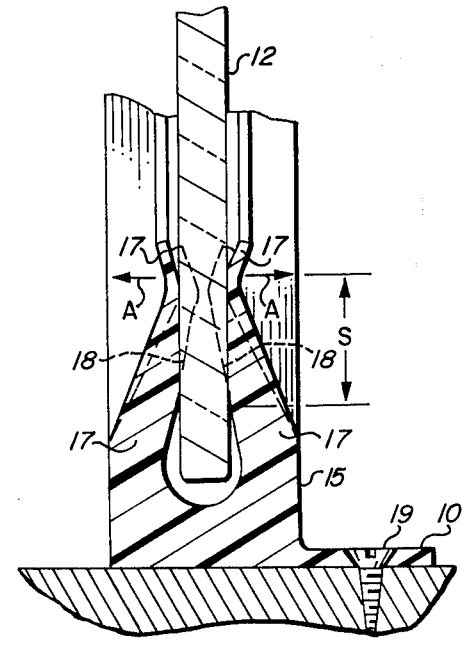
FIG. 3 is a sectional view of the frame - pane assembly of FIG. 1 taken along section line 3—3 thereof.

Referring to FIG. 3, the initial position of the flanges 17 on the lower edge 15 of the assembly is shown by the dashed lines. As the pane 12 is inserted between the flanges 17, they are deformed outwardly in the direction of the arrows A to provide sealing engagement along the lines S in the same general manner as illustrated in FIG. 2.

Figure 4:
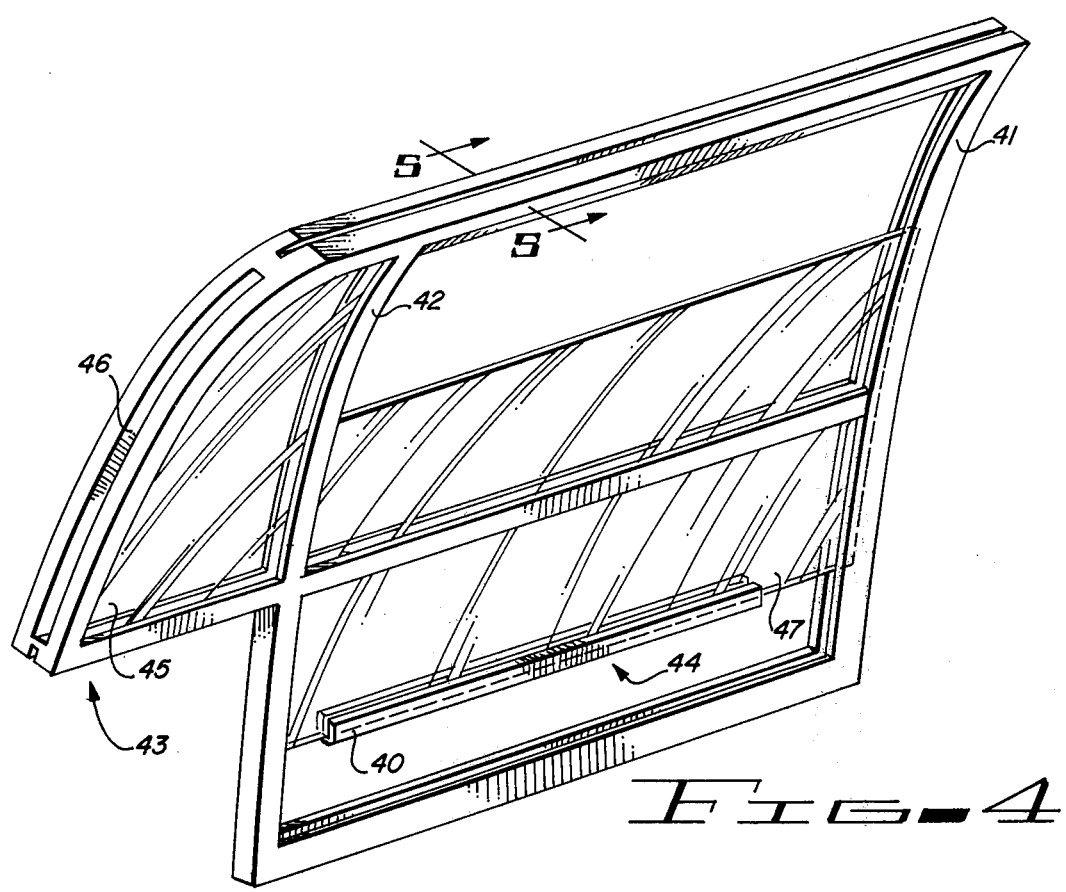
FIG. 4 is a perspective view of another pane - frame assembly, specially adapted for use in automobiles or other vehicles.
Figure 5:
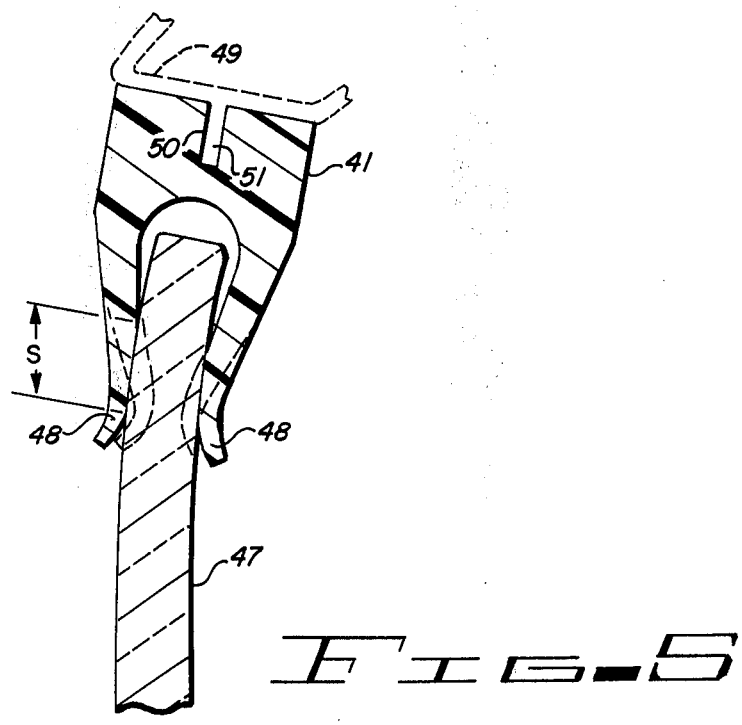
FIG. 5 is a sectional view of the assembly of FIG. 4 taken along section line 5—5 thereof and illustrating a preferred mode of attaching the frame to the vehicle.

FIGS. 4-5 illustrate an alternate preferred embodiment of the invention specially adapted for use in automobiles and other vehicles. The single-piece frame member 41 is divided by a vertical post 42 into a fixed window portion 43 and a sliding window portion 44. The pane 45 in the fixed portion 43 is inserted into the frame 41 through the slot 46 in the same manner as the pane 12 of FIGS. 1-3. The window pane 47 of the sliding portion 44 is slidably received in the frame 41 between the inwardly projecting flange members. The pane 41 may be curved, as shown in FIG. 4, or may be a conventional flat automobile window glass. A member 40 attached to the bottom of the pane 47 provides for attachment of a conventional crank mechanism to raise and lower the window.

FIG. 5 details the general method sealing the top edge of the pane 47 when it is fully raised. The position of the flange members 48, when the window is open, is shown by the dashed lines and the sealing engagement along the lines S between the pane and the flange members 48, as shown by the solid lines. The window frame 41 may be conveniently attached to a frame member 49 of the vehicle by means of a slot 50 in the frame 41 which is engaged by a flange 51 depending downwardly from the frame member 49. Alternatively, the frame member 11 (FIGS. 1-3) or 41 (FIGS. 4-5) can be attached (see FIG. 3) to other structural members 18 of which the window is a part by means of metal or wood screws 19 or by any other suitable means such as an adhesive, stapling, etc.

If desired to provide additional resistance to leakage between the pane 12 and the flanges 17, a suitable sealing material can be applied to the inner edges of the flanges 17 just prior to inserting the pane therebetween. Preferably this sealer would be a non-setting material.

Having described my invention in such terms as to enable those skilled in the art to understand and practice it without undue experimentation, and having identified the presently preferred embodiments thereof, I claim:

1. A combination structural frame - window pane assembly comprising, in combination:
   a. a single-piece continuous frame member formed of moldable plastic and having an elongate slot formed in one side thereof, said slot being shaped and dimensioned to slidably receive a window pane member therethrough, said frame member being shaped and dimensioned to completely enclose the periphery of said pane member when fully inserted through said slot;
   b. a pair of spaced, inwardly projecting, resiliently deformable flanges formed integrally with the inner periphery of said frame member, said deformable flanges being normally spaced a distance smaller than the thickness of said pane and being further shaped and dimensioned to be resiliently deformed and spaced apart by the edges of said pane when inserted therebetween to provide a line of sealing engagement between said flanges and said pane, said line of sealing engagement being at least equal to the thickness of said pane; and
   c. a window pane member shaped and dimensioned to be inserted through said slot and retained within said frame by the line of sealing engagement of the edges thereof between said inwardly projecting flanges, the complete combination structural frame - window pane assembly being effected by the single step of inserting said window pane member through said slot to said line sealing engagement position.

* * * * *